(12) United States Patent
Spain

(10) Patent No.: US 6,405,995 B1
(45) Date of Patent: Jun. 18, 2002

(54) SOLAR POWERED FLUSH VALVE FOR CENTER PIVOT IRRIGATION SYSTEM

(76) Inventor: Robin L. Spain, Drawer U, Olton, TX (US) 79064

( * ) Notice: Subject to any disclaimer, the term of this patent is extended or adjusted under 35 U.S.C. 154(b) by 0 days.

(21) Appl. No.: 09/629,460

(22) Filed: Jul. 31, 2000

(51) Int. Cl.[7] .......................... F16K 31/02; F16K 31/44
(52) U.S. Cl. ................... 251/129.11; 251/251
(58) Field of Search ..................... 251/129.01, 129.11, 251/129.14, 251, 257, 252, 259

(56) References Cited

U.S. PATENT DOCUMENTS

| 521,350 A | 6/1894 | Turner |
| 582,911 A | 5/1897 | Frederick |
| 877,063 A | 1/1908 | Edes |
| 995,903 A | 6/1911 | Rabiger |
| 1,479,724 A | 1/1924 | MacIsaac |
| 1,496,317 A | 6/1924 | Johnson |
| 1,538,404 A | 5/1925 | Laird |
| 1,763,942 A | 6/1930 | Baker |
| 2,066,112 A | 12/1936 | Humblet ...................... 251/40 |
| 2,344,304 A | 3/1944 | Hooper ......................... 137/69 |
| 2,366,693 A | 1/1945 | Benaway ...................... 277/20 |
| 2,946,343 A | 7/1960 | Sterrett et al. ............... 137/390 |
| 3,014,688 A | 12/1961 | McCollum .................. 251/111 |
| 3,985,335 A | * 10/1976 | Burke ......................... 251/176 |
| 4,314,592 A | 2/1982 | Silvey ....................... 144/34 A |
| 4,461,453 A | 7/1984 | Wilson ....................... 251/251 |
| 4,535,813 A | 8/1985 | Spain ........................ 137/625.5 |
| 4,637,426 A | 1/1987 | Lyon ........................... 137/433 |
| 5,109,887 A | 5/1992 | Saito et al. ............. 137/625.46 |
| 5,297,774 A | * 3/1994 | Chuang ........................ 251/57 |
| 5,403,498 A | * 4/1995 | Morrissey et al. .......... 210/767 |
| 5,801,519 A | * 9/1998 | Midya et al. ................ 323/222 |
| 6,109,358 A | * 8/2000 | McPhee et al. ............. 166/401 |

\* cited by examiner

*Primary Examiner*—Philippe Derakshani
*Assistant Examiner*—David A Bonderer
(74) *Attorney, Agent, or Firm*—Jacobson Holman, PLLC

(57) ABSTRACT

An automatic solar powered flush valve by which sand or gravel may be quickly and efficiently flushed from piping associated with a center pivot irrigation system. The valve, when moved to an open position, provides a fully open port which enables rapid discharge water flow to flush sand and gravel from the piping in a very short time thus enabling the valve to be closed quickly in order to save irrigation water. The valve includes a movable ball valve combined with a rotatably driven eccentric which moves the ball to a closed position on a valve seat and permits the ball to move away from the valve seat when the eccentric is rotated to a position to permit such movement of the ball valve. The eccentric is driven by an electric motor powered by a battery charged by a solar panel and a timer controls the frequency and duration of each cycle of opening and closing of the valve.

5 Claims, 5 Drawing Sheets

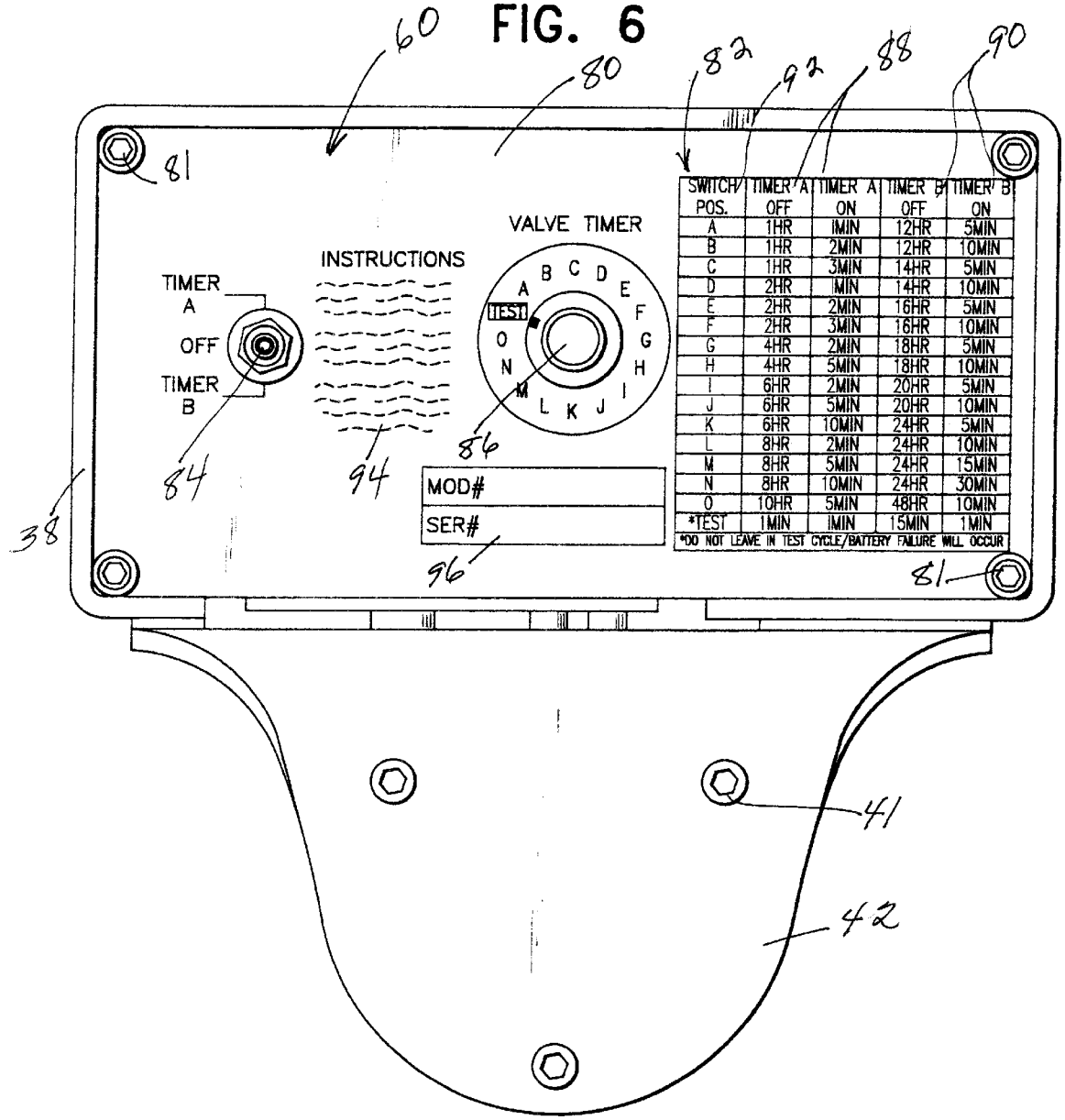

SOLAR POWERED FLUSH VALVE FOR CENTER PIVOT IRRIGATION SYSTEM

BACKGROUND OF THE INVENTION

1. Field of the Invention

The present invention relates generally to flush valves by which sand or gravel may be quickly and efficiently removed from piping associated with a center pivot irrigation system. Such flush valves, when moved to an open position, provide a fully open port which enables rapid discharge of water for flushing all sand and gravel from the irrigation piping in a very short period of time.

2. Description of the Prior Art

Center pivot irrigation systems are well known and include an elongated elevated water supply pipe rotatably connected at one end to a well and pump unit to supply pressurized water into the pipe. The pipe is supported by a plurality of spaced, ground engaging driven elements, such as wheels, which transport the pipe in a generally horizontal position around a circular path about a center pivot formed by the well and pump unit. A plurality of generally vertical spray pipes depend from the supply pipe, and nozzles at the lower ends of the spray pipes discharge irrigation water adjacent crop level. The elevated supply pipe usually includes a manually operated, elevated end valve which can be opened to enable sand or gravel to be flushed out of the elevated pipe when in open position. Depending upon the quantity of sand and gravel entrained in the irrigation water, the end valve is either left open continuously or manually opened periodically to flush sand and gravel out of the elevated pipe.

The following United States patents relate to various types of valve structures:

| | | |
|---|---|---|
| 521,350 | 1,538,404 | 3,014,688 |
| 582,911 | 1,763,942 | 4,314,592 |
| 877,063 | 2,066,112 | 4,461,453 |
| 995,903 | 2,344,304 | 4,535,813 |
| 1,479,724 | 2,366,693 | 4,637,426 |
| 1,496,317 | 2,946,343 | 5,109,887 |

While the above patents disclose various types of ball valves, including cam operated ball valves, none disclose a flush valve especially suited for flushing sand and gravel from the piping associated with center pivot irrigation systems. These prior patents also do not disclose an automatic timer controlled, solar powered flush valve located at the lower end of a vertical pipe for connection to an outer end portion of a center pivot elevated irrigation water supply pipe. Further, the prior patents do not disclose a valve that provides a fully opened port and is cam operated between a closed and open position to enable rapid discharge of the water and any entrained sand or gravel which enables the valve to be left open only for a short time, thus saving irrigation water while still enabling sand and gravel to be efficiently flushed from the irrigation system.

SUMMARY OF THE INVENTION

The present invention is a timer controlled, solar energy powered, cam operated ball valve which can quickly and efficiently flush sand and gravel from an elevated center pivot irrigation water supply pipe when the ball valve is moved to open position and quickly terminate the discharge of flushing water when the valve is moved to closed position. The automatic ball valve of the present invention is preferably located vertically at the lower end of a down pipe which is connected at its top adjacent the outer end of the irrigation water supply pipe.

The ball valve of the present invention includes a vertical housing which is connected to the lower end of the down pipe preferably by screw threading or the like. The ball valve and ball valve seat are oriented so that gravity and water pressure in the irrigation system will bias the ball valve towards open position. A rotatably driven cam engages the ball valve in opposed relation to the force exerted by gravity and water pressure to retain the ball valve;closed. Rotation of the cam permits the ball valve to move downwardly to open position and upwardly to close position, all in response to an automatic timer control. The cam engaging the ball valve is driven by a solar power unit which includes an electric motor powered from a battery that is charged by an upwardly facing solar power panel. The solar power unit is preferably located in spaced relation to the discharge port for the valve. The discharge port has a cross-sectional area at least generally equal to the cross-sectional area of the down pipe to enable rapid flow of irrigation water out of the down pipe to efficiently and quickly flush sand and gravel from the irrigation system.

An object of the present invention is to provide an automatic solar powered flush valve for center pivot irrigation systems which is timer controlled.

A further object of the present invention is to provide a solar powered flush valve for center pivot irrigation systems which includes a rapidly opening and closing ball valve oriented below a downwardly facing ball valve seat with an operating cam engaging the ball valve for opening and closing the valve.

A still further object of the present invention is to provide an automatic flush valve for center pivot irrigation systems which is driven by an electric motor powered by a rechargeable battery that is recharged by an upwardly facing solar panel located adjacent the discharge port of the valve.

Another object of the present invention is to provide a flush valve for center pivot irrigation systems which is located at the lower end of a down pipe adjacent the outer end of the elevated supply pipe of the center pivot irrigation system.

Yet another object of the present invention is to provide a solar powered flush valve for center pivot irrigation systems which includes a sealed housing to assure maintenance free operation for extended time periods with the flush valve including a ball valve moved vertically in response to rotation of an eccentric powered by a gear motor with the motor being powered by a battery that is charged by a solar panel.

Still another object of the invention is to provide a flush valve for center pivot irrigation systems which is timer controlled with the valve open and valve closed time cycles being selected from a preset large number of available cycles.

A still further object of the present invention is to provide a solar powered flush valve which includes a vertical valve housing provided with a discharge port having a cross-sectional discharge area generally equal to the cross-sectional area of the down pipe supporting the valve and connected to the elevated water supply pipe of the center pivot irrigation system.

Yet another object of this invention to be specifically enumerated herein is to provide a solar powered flush valve for center pivot irrigation systems in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 6 is an elevational view of the timer control panel and flush cycle chart.

DESCRIPTION OF THE PREFERRED EMBODIMENT

Figure 1:
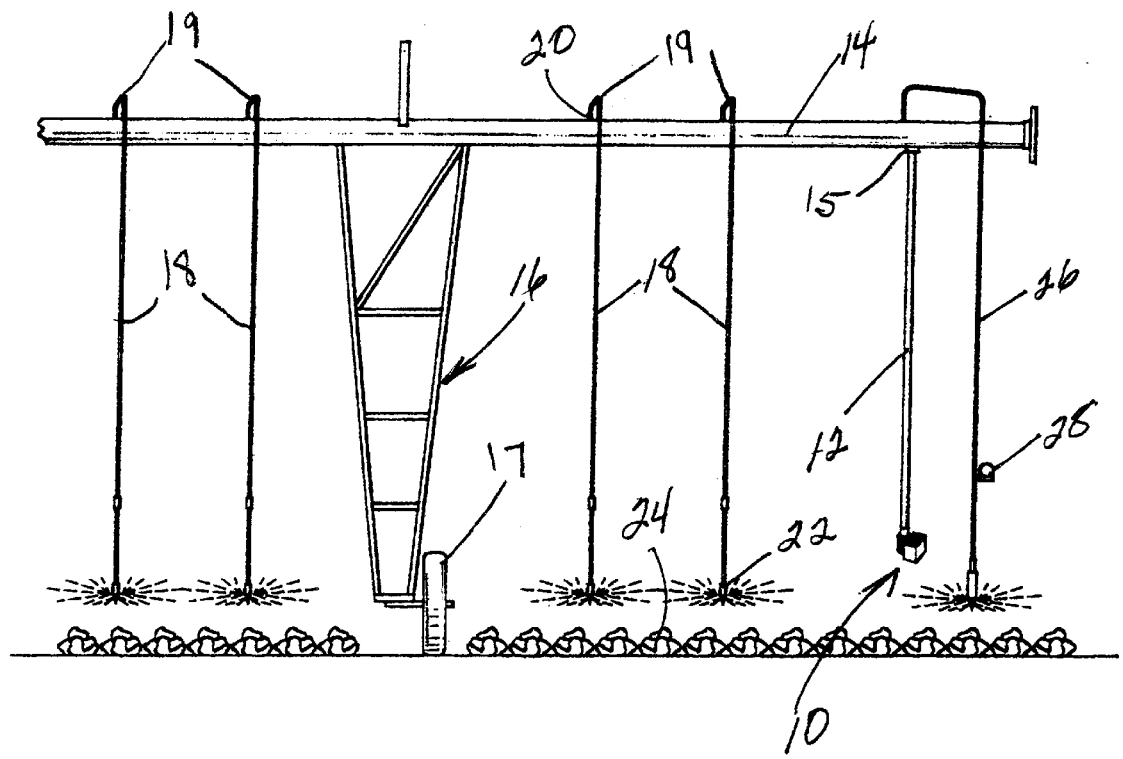
FIG. 1 is a schematic elevational view of a portion of a center pivot irrigation system illustrating the flush valve of the present invention installed at the lower end of a down pipe adjacent the outer end of an elevated water supply pipe.

Although only one preferred embodiment of the invention is explained in detail, it is to be understood that the invention is not limited in its scope to the details of construction and arrangement of components set forth in the following description or illustrated in the drawings. The invention is capable of other embodiments and of being practiced or carried out in various ways. Also, in describing the preferred embodiment, specific terminology will be resorted to for the sake of clarity. It is to be understood that each specific term includes all technical equivalents which operate in a similar manner to accomplish a similar purpose.

The flush valve of the present invention is generally designated by reference numeral 10. As shown in FIG. 1, the flush valve 10 is supported at the lower end of a down pipe 12. The upper end of the down pipe 12 is connected to an elevated irrigation water supply pipe 14 adjacent its outer end on the underside of the pipe 14 as at 15. The irrigation pipe 14 generally extends horizontally and is supported by a plurality of depending drive units, generally designated by reference numeral 16, with ground engaging wheels 17. The drive units 16 move the elevated pipe 14 in a circular path about a center pivot (not shown) which includers a pump and well assembly with a vertical water supply pipe rotatably supporting the inner end of the elevated pipe 14 in a manner well known in this art.

The water supply pipe 14 is provided with a plurality of depending spray pipes 18 which have their upper ends 19 extending above the pipe 14. The upper ends 19 are connected to the elevated pipe 14 along the upper surface of the pipe 14 as indicated by reference numeral 20 so that any sand or gravel in the water will not enter the spray pipes 18. Thus, the sprinkler nozzles 22 at the lower ends of the spray pipes 18 will not become clogged with sand or gravel. If sand or gravel or other debris is present, it will accumulate along the lower surface of the interior of the generally horizontal pipe 14 to which the down pipe 12 is connected. The sprinkler nozzles 22 are oriented in a position above crops 24 but adjacent to the crops in order to reduce evaporation and reduce the possibility of winds causing the water to be discharged in an area that is not beneficial to the plants. An outermost spray pipe 26 may be provided with a pressure gauge 28 for observation to determine whether the irrigation system is properly operating.

The flush valve 10 includes a vertical inlet pipe 30 having an upper end which is preferably screw threaded externally at 32 for threaded connection with the down pipe 12. The lower end of the inlet pipe 30 includes a circular flange 34 extending peripherally thereof which is mounted on flange 76 projecting laterally from a housing 38. The flange 76 has a circular raised portion 36 on its upper surface which generally matches and mates with flange 34 on the inlet pipe 30. Laterally extending flange 76 is preferable integral with the body of housing 38, formed as a single structure, preferably of metal, such as aluminum or the like, and gussets 78 serve to reinforce the connection of the flange 76 to the housing 38.

Attached to the side of the housing 38 below flange 76, is an L-shaped bracket 43 having a bottom flange 42 generally parallel with and spaced from the flange 76 at the upper end of the housing 38. The bracket 43 includes a vertical portion 44 secured to a side wall of the housing 38 as by welding, gluing or the like.

Figure 5:
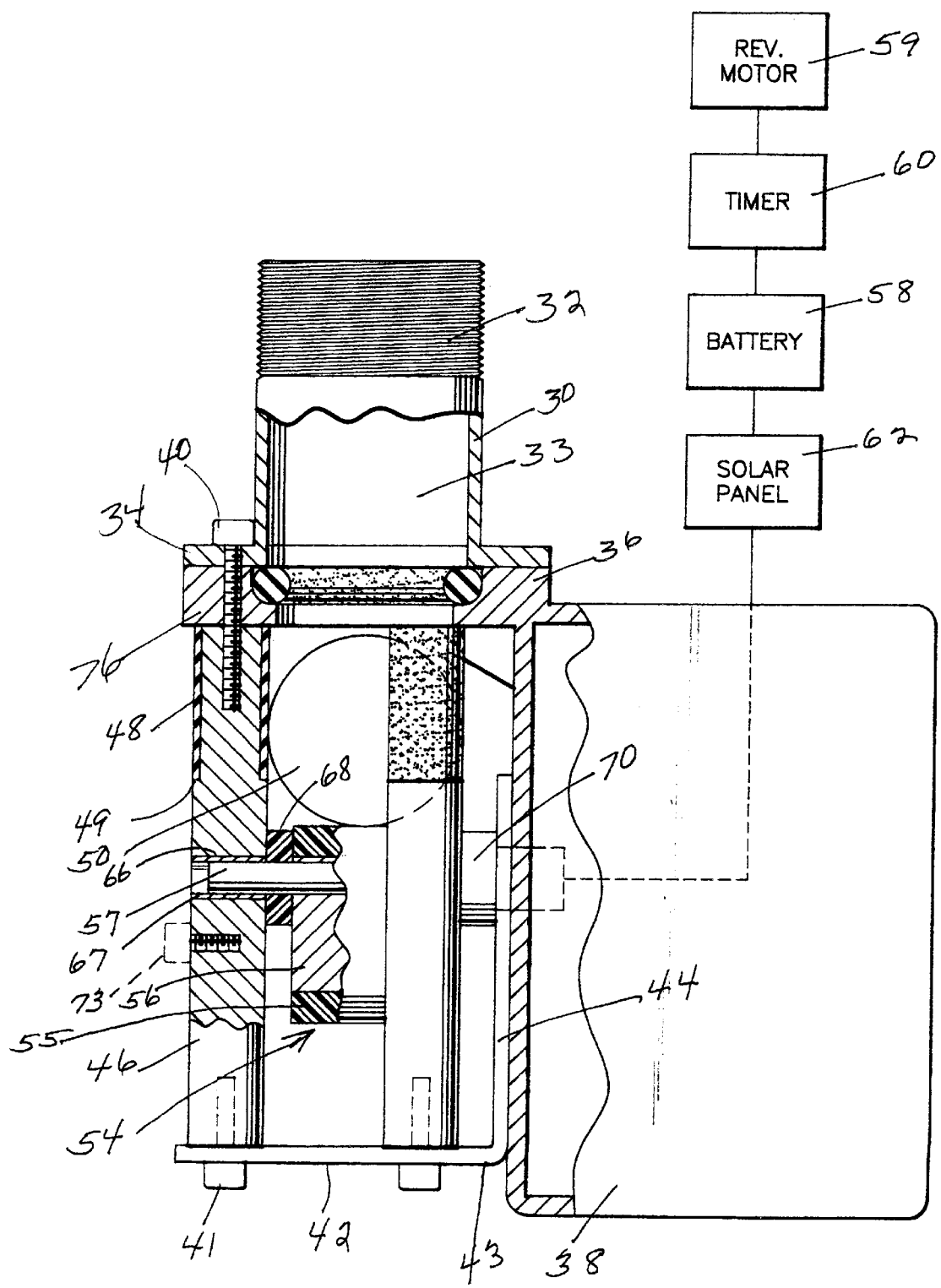
FIG. 5 is a vertical sectional view taken along section line 5—5 on FIG. 4 illustrating specific structural details of the valve.

A plurality of vertically oriented cylindrical metal spacer rods 46 are positioned in a generally circular arrangement and extend between flanges 76 and 42. Fastening cap bolts 40 extend through the flanges 34 and 76 and are screw threaded into the upper ends of the spacer rods 46, as illustrated in FIG. 5. The lower ends of the spacer rods 46 are secured to flange 42 by cap bolts 41 which are screw threaded into the bottom end of the rods 46. The upper end portion of each spacer rod 46 is provided with a sleeve 48 having a smooth outer surface, preferably a suitable plastic material, which has a lower end abutting a shoulder 49 on spacer rods 46.

A spherical ball valve 50 is positioned within the spacer rods 46 and engages the surfaces of the sleeves 48 on the upper end portions of the spacer rods 46. There are preferably three spacer rods 46 which are arranged in an equally spaced relationship at about 1200 apart to form a cage for controlling the vertical movement of ball valve 50 in a direction toward and away from an O-ring valve seat 52 received in recess 53 in flange 36. The valve seat 52 is clamped between the flanges 34 and 76 and is exposed to the interior of the passageway 33 through the inlet pipe 30 and flanges 34 and 76. The diameter of the valve seat is preferably sized to receive a substantial portion of the periphery of the ball valve 50 when in its closed position as illustrated by broken line in FIG. 3. The ball valve 50 is preferably constructed of a hard plastic or elastomeric material although it could be metal such as stainless steel or the like. The surfaces of the ball valve 50 are prevented from being marred by contact with the metal spacer rods 46 inasmuch as during vertical movement of the ball valve 50, it is always in contact with the plastic sleeves 48 on the spacer rods 46.

Figure 3:
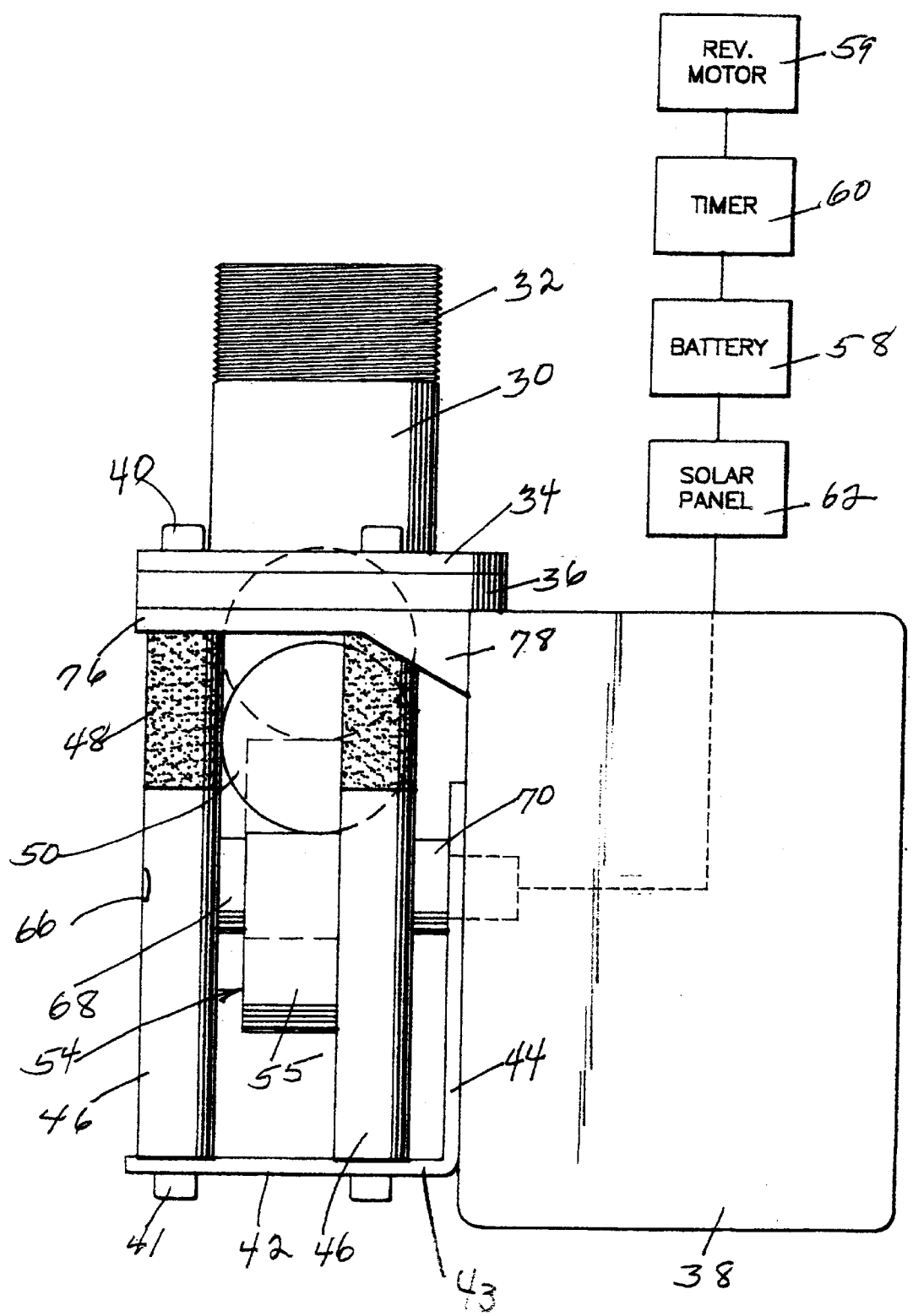
FIG. 3 is a side elevational view of the flush valve shown in FIG. 2.
Figure 4:
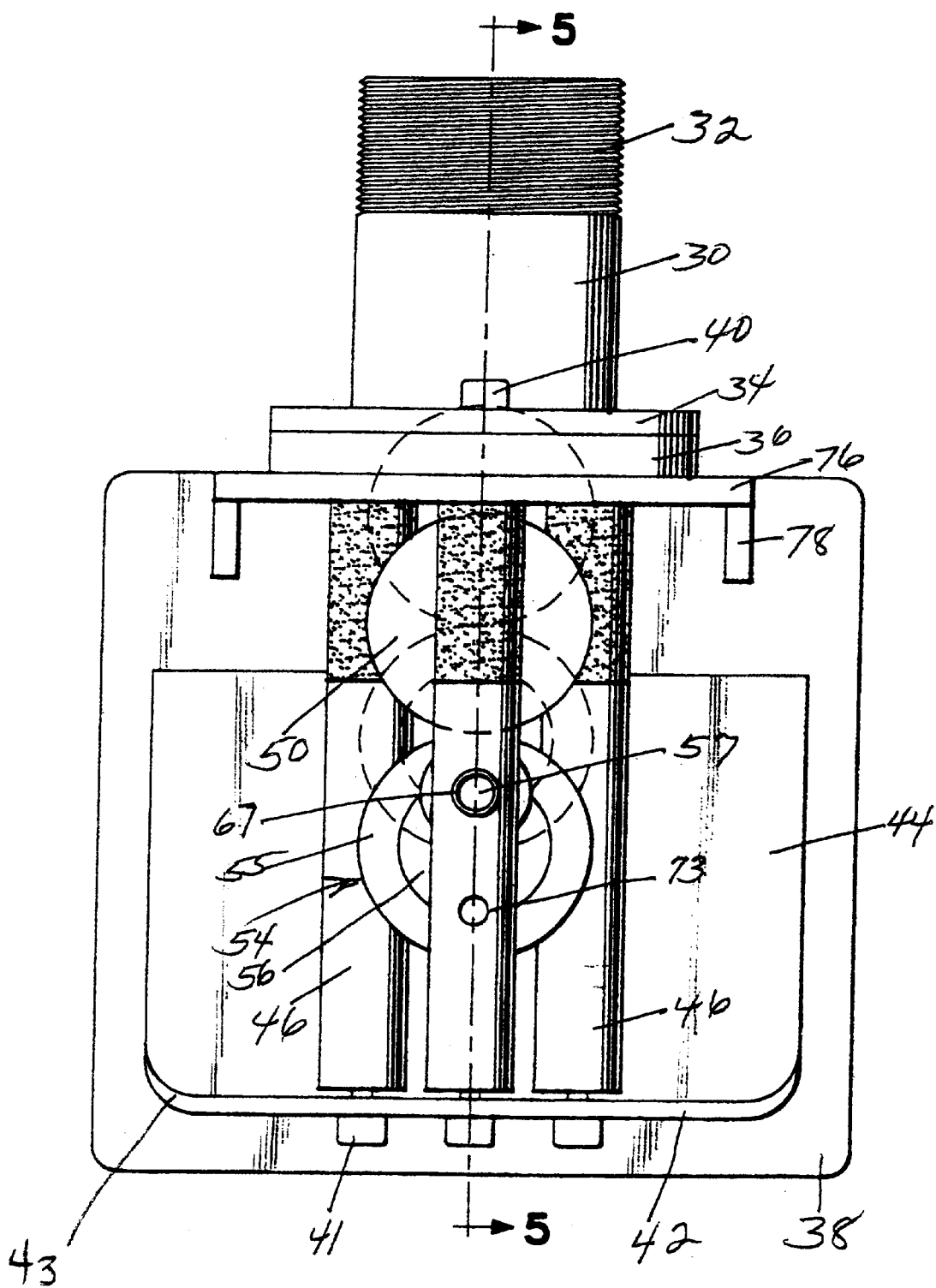
FIG. 4 is an end elevational view of the flush valve shown in FIGS. 2 and 3, illustrating the positions of the ball valve in broken lines.

Positioned below the ball valve 50 is a cam structure or eccentric generally designated by reference numeral 54. The cam structure 54 is in the form of a cylindrical member 55, preferably of a plastic or elastomeric material, mounted on a cylindrical member 56, preferably of metal. The cylindrical member 56 is rotatably supported and driven by a shaft 57 oriented in eccentric relation to the center of the cylindrical members 55 and 56 so that rotation of the cylindrical members 55 and 56 by the shaft 57 causes the cylindrical members 55 and 56 to move in an eccentric path about shaft 57. The eccentric path of cylindrical members 55 and 56 causes the cam structure 54 to move the ball valve 50 between open and closed positions as illustrated in FIGS. 3–5. The position of the cam structure 54 when the ball valve 50 is in closed position is illustrated in broken lines in FIGS. 3 and 4 and when the valve 50 is in the open position, in solid lines in FIGS. 4 and 5.

The shaft 57 has an outer end journalled in a bore 66 extending through the spacer rod 46 which is positioned in remote relation to the housing 38 with the bore 66 preferably including a suitable sleeve-type bearing or bushing 67 to support the outer end of the shaft 57. A cylindrical spacer 68 is journalled on the shaft 57 and positioned between the axial surface of the eccentrically rotating cylindrical members 55 and 56 and the interior surface of the spacer rod 46. The spacer 68 positions the cam structure 54 in properly oriented relation so that the radial surface of the cam structure 54 is correctly aligned with the peripheral surface of the ball valve 50. The portion of the shaft 57 inwardly of the cam structure 54 is also provided with a spacer 70 which extends between the axial surface of the cam structure 54 and the surface of the flange or bracket 44 secured to the housing 38. The spacer 70 thus maintains the cam structure 54 properly 11 oriented and shields the shaft 57 where it extends through the bracket 44 and into the housing 38.

As illustrated in FIGS. 3–5, the ball valve 50 is oriented for movement within the interior of the sleeves 48 on the three spacer rods 46 so that the ball valve 50 will engage the O-ring valve seat 52 when in its elevated, broken line, closed position. The ball valve 50 loosely engages the sleeves 48 on the upper end portions of the spacer rods 46 when in its closed or elevated position as shown in dotted lines in FIGS. 4 and 5 and when in its open or lowered position illustrated in solid line in FIGS. 3–5. The cam structure 54 and ball valve 50 may be constructed of stainless steel or hard plastic material and the spacers 68 and 70 may be constructed of the same material as the eccentrically rotating cylindrical member 55.

Figure 2:
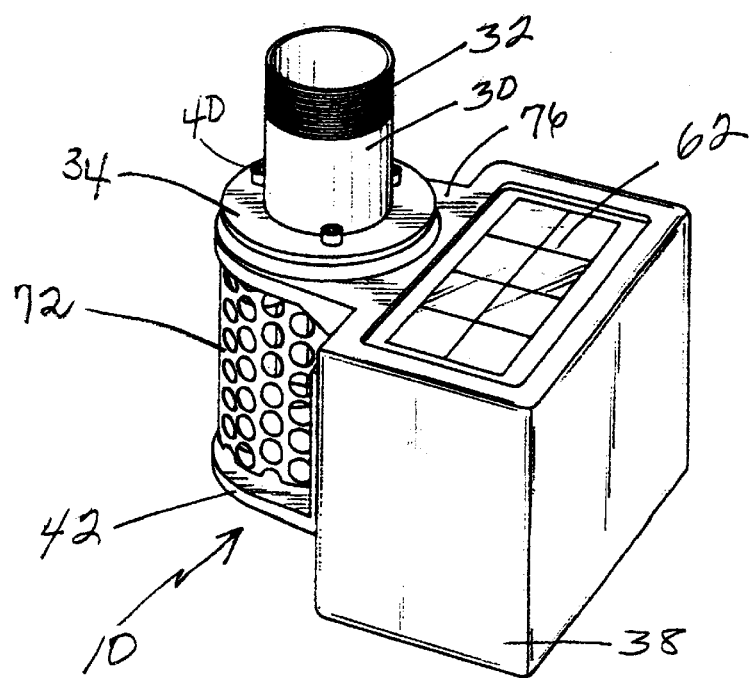
FIG. 2 is a perspective view of the flush valve of the present invention with the outer guard member removed.

A perforated rigid guard 72, preferably made of metal, surrounds the spacer rods 46, cam structure 54 and ball valve 50, as shown in FIG. 2. The guard 12 protects the valve mechanism from damage and also prevents unauthorized access to the cam structure 54 and ball valve 50 thus avoiding possible injury to a person or animal engaging an appendage between the moving cam structure 54 and ball valve 50. The guard 72 includes a plurality of large openings 74 and its top is spaced approximately one inch below the flange 76 in order to permit free flow of water, sand and gravel outwardly from beneath the flange 76 when the valve is opened. The guard is generally U-shaped in configuration and of rigid construction with free side edges abuttingly engaging the outer surface of the bracket vertical portion 44 while surrounding the spacer rods 46 and cam mechanism 54. The guard rests on the upper surface of the flange 42, and a short threaded cap bolt 73 secures the central outer portion of the guard 72 to the spacer rod 46 which supports the outer end of the shaft 57. The cap bolt 73 enables removal of the guard 72 when necessary or desired to clean the valve 50 and cam structure 54 or replace the components of the valve and cam structure.

As illustrated schematically in FIGS. 3 and 5, the shaft 57 extends into the interior of the housing 38 and is driven by a reversible electric motor 59 that is battery powered by a battery 58. The motor 59 is timer controlled by a timer 60, and the battery 58 is recharged by a solar panel 62 to provide electrical energy to the motor 59.

As illustrated in FIG. 6, the timer 60 includes a control panel 80 secured to housing 38 by fasteners 81 to provide access to the interior of the housing. The panel 80 includes a timer cycle chart 82 preferably printed on or painted on one end area thereof, a three position selector switch 84 mounted at the other end area thereof and a rotary valve timer switch 86 mounted in a central area thereof.

The selector switch 84 includes an "off" position, a "timer A" position and "timer B" position which correlates to the "timer A" columns 88 on chart 82 and the "timer B" columns 90 on chart 82. The valve timer switch 86 includes positions "A"-"O" and "test" which correlate with the "switch position" column 92 on chart 82. The control panel 8d also includes an area 94 for instruction indicia and an area 96 for identification indicia. The switches 84 and 86 enable the valve 10 to be closed for a relatively long period of time and opened for a relatively short period of time during which the water, sand, gravel and other debris are flushed from the elevated supply pipe 14. For example, the closed cycle could be set for one to forty-eight hours and the open cycle for one to thirty minutes. By setting switch 84 in position "timer A", the valve timer switch 86 can be set in any position "A"-"O" to set the "off" (valve closed) time and the "on" (valve open) time in a cycle of operation to effectively flush sand and gravel from the center pivot irrigation system in a period of time that can be adjusted to be as short as possible depending upon the requirements in each installation. This enables the use of a minimum quantity of irrigation water to be used in flushing the irrigation system. One of the positions for the valve timer switch 86 is "test", thus providing different test cycles when switch 84 is in "timer A" or "timer B" position. By having a multitude of different time cycles, the operator is provided with the capability of selecting the appropriate timer cycle for flushing the sand and gravel from the supply pipe of the center pivot irrigation system on which the valve is installed.

In operation, the flush valve 10 of the present invention is installed on the lower end of a down pipe 12 which is connected at its upper end to the elevated generally horizontally extending irrigation water supply pipe 14. When assembled on the down pipe 12, the solar panel 62 of the valve 10 faces upwardly towards the sun for capturing the solar energy to power the valve unit. The operator then selects the desired timer cycle by positioning the valve timer switch 86 and selector switch 84, and the valve 10 is then in operation. If desired, a "test" cycle can be initiated first by positioning switch 86 in "test" position and switch 84 in "timer A" or "timer B" position.

As the center pivot irrigation system operates with water supplied through the irrigation water supply pipe 14 to the depending spray pipes 18, the timer periodically causes the battery 58 to energize motor 59 to rotate shaft 57 and cam structure 54 which allows ball valve 50 to move away from the O-ring valve seat 52 to an open position, where the cam structure 54 and ball valve 50 remain for a preselected time in accordance with the selected timer cycle. Upon opening of the ball valve 50, the water in down pipe 12 and supply pipe 14 are caused to exit the valve 10 and carry with it the sand, gravel and other debris which may have collected along the interior bottom surface of the supply pipe 14 while the valve 10 was in the closed position. Upon completion of the flushing cycle, the motor 59 is energized and the shaft 57 and cam structure 54 continue rotation in the same direction which causes the ball valve 50 to move back up into seated engagement with the O-ring valve seat 52. This closes the valve and prevents further water from exiting the down pipe 12 for a predetermined time in accordance with the selected timer cycle. In the event the cam structure or ball valve becomes stuck or jammed because of debris or for any other reason, the motor 59 will be driven in reverse direction by a microprocessor in an effort to flush out or dislodge the debris. Operation of the motor can be automatically stopped if the cam structure or ball valve become jammed such that they cannot move in either direction.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A flush valve for a center pivot irrigation system having a water supply pipe oriented in elevated position in relation to a surface to be irrigated and a down pipe adjacent an outer end of the supply pipe, said valve comprising a housing adapted to be connected to and communicated with a lower end of said down pipe, a valve seat on said housing in communication with said down pipe, a valve member supported from said housing for movement between a closed position in engagement with the valve seat and an open position spaced from the valve seat, a cam structure engaged with the valve member to move it between open and closed positions, said housing including an open port communicating with the valve seat to discharge water, sand and gravel from the down pipe when the valve member is in open position, and a solar powered unit operating said cam structure for cyclically opening and closing the valve member, said cam structure being a cylindrical member rotatable about an eccentric axis transverse of and below the valve seat and including a radial peripheral surface movable in an eccentric path, said valve member being a ball valve engaged by the peripheral surface of the cylindrical member for movement between closed and open positions in response to eccentric rotational movement of the cylindrical member, said open port being defined by a plurality of vertical members oriented to form a cage for retaining the ball valve in alignment with and engaged with a radial peripheral surface of the cylindrical member, said housing including an output shaft from the motor having an outer end journalled in one of said members, said housing including a pair of vertically spaced, aligned flanges with the members forming the cage extending between the flanges and oriented in circumferentially spaced relation to the ball valve and cam structure to form a cage for the ball valve.

2. The flush valve as defined in claim 1, wherein a protective guard extends from a lower of said flanges to a position spaced below the upper of said flanges, said guard being generally U-shaped in configuration and being secured to one of said members forming the cage to enable the guard to be removed, said guard including a plurality of perforations to enable rapid flow discharge of water to flush sand, gravel and other debris from the irrigation system when the ball valve is moved to open position.

3. A flush valve for a center pivot irrigation system having a water supply pipe oriented in elevated position in relation to a surface to be irrigated and a down pipe adjacent an outer end of the supply pipe, said valve comprising a housing adapted to be connected to and communicated with a lower end of said down pipe, a valve seat on said housing in communication with said down pipe, a valve member supported from said housing for movement between a closed position in engagement with the valve seat and an open position spaced from the valve seat, a cam structure engaged with the valve member to move it between open and closed positions, said housing including an open port communicating with the valve seat to discharge water, sand and gravel from the down pipe when the valve member is in open position, and a solar powered unit operating said cam structure for cyclically opening and closing the valve member, said solar powered unit includes a motor and a timer, said timer having a plurality of selectable timing cycles for operating said cam structure to cyclically open and close the valve member, said valve member being a ball valve located below said valve seat and movable away from said valve seat by gravity, said valve member actuator including a rotatably driven cam having a peripheral cam surface engaging a lower surface of said ball valve to move the ball valve into engagement with said valve seat.

4. A valve comprising a housing adapted to be connected to and communicated with a flow pipe, a valve seat in said housing in communication with said flow pipe, a valve member supported from said housing for movement between a closed position in engagement with said valve seat and an open position spaced from said valve seat, a cam structure engaged with said valve member to move it between open and closed positions, said housing including an open port communicating with said valve seat to discharge material from said flow pipe when said valve member is in open position, and a solar powered motor rotating said cam structure for cyclically opening and closing said valve member, said ball valve member being a ball valve located below said valve seat and movable away from said valve seat by gravity, said cam structure having a peripheral cam surface engaging a lower surface of said ball valve to move the ball valve upwardly into engagement with said valve seat.

5. A valve comprising a housing adapted to be connected to and communicated with a fluid flow pipe, a valve seat in said housing in communication with said flow pipe, a valve member supported from said housing for movement between a closed position in engagement with said valve seat to stop fluid flow in said flow pipe and an open position spaced from said valve seat to permit fluid flow in said flow pipe, a rotatable cam structure engaged with said valve member to move said valve member between open and closed positions, an electrically powered motor rotating said cam structure for cyclically opening and closing said valve member, said valve member being a ball valve located below said valve seat and movable away from said valve seat by gravity, said cam structure having a peripheral cam surface engaging a lower surface of said ball value to move the ball valve upwardly into engagement with said valve seat.

* * * * *